United States Patent
O'Connor et al.

(10) Patent No.: US 7,120,714 B2
(45) Date of Patent: Oct. 10, 2006

(54) HIGH-SPEED STARVATION-FREE ARBITER SYSTEM, ROTATING-PRIORITY ARBITER, AND TWO STAGE ARBITRATION METHOD

(75) Inventors: Dennis M. O'Connor, Chandler, AZ (US); Michael W. Morrow, Chandler, AZ (US); Stephen Strazdus, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 10/445,533

(22) Filed: May 27, 2003

(65) Prior Publication Data
US 2004/0243752 A1    Dec. 2, 2004

(51) Int. Cl.
G06F 13/14     (2006.01)
G06F 13/00     (2006.01)
G06F 13/36     (2006.01)
G06F 13/362    (2006.01)

(52) U.S. Cl. .................... 710/243; 710/240; 710/241; 710/244; 710/111; 710/113; 710/116

(58) Field of Classification Search ........ 710/111–113, 710/119–120, 241–243, 309, 116, 244
See application file for complete search history.

(56) References Cited

U.S. PATENT DOCUMENTS 4,554,628 A * 11/1985 Bell ........................... 710/117
5,392,434 A * 2/1995 Bryant et al. ................ 710/244
5,692,136 A * 11/1997 Date et al. ................... 710/107
5,809,278 A * 9/1998 Watanabe et al. ........... 711/150
5,832,278 A * 11/1998 Pham .......................... 710/243
6,954,812 B1* 10/2005 Lavigne ....................... 710/243
2003/0114120 A1* 6/2003 Kwong et al. ................ 455/90

FOREIGN PATENT DOCUMENTS

WO    WO 0213446 A3 *  2/2002

* cited by examiner

Primary Examiner—Mark H. Rinehart
Assistant Examiner—Thomas J. Cleary
(74) Attorney, Agent, or Firm—Schwegman, Lundberg, Woessner & Kluth, P.A.

(57) ABSTRACT

A two-stage arbiter system comprises a first-stage arbiter to grant a request to one of a plurality of requestors in accordance with a first arbitration scheme and a second-stage arbiter to grant one of the remaining requests in accordance with a second arbitration scheme. The first arbitration scheme may be a fast arbitration scheme such as a fixed-priority scheme, and the second arbitration scheme may be a rotating priority-based arbitration scheme or a least-recently-granted arbitration scheme. The first-stage arbiter may operate in a first pipelined stage, and the second-stage arbiter may operate in a second pipelined stage. Two-stage arbitration may help improve access of lower-priority requestors in a pipelined system. In one embodiment, a rotating-priority arbitrator includes a pseudo-random number generator to generate an amount for rotating priorities prior to arbitration. The rotating-priority arbiter may use either a counter or linear-feedback shift register to rotate priorities of requests.

25 Claims, 4 Drawing Sheets

HIGH-SPEED STARVATION-FREE ARBITER SYSTEM, ROTATING-PRIORITY ARBITER, AND TWO STAGE ARBITRATION METHOD

TECHNICAL FIELD

The present invention pertains to arbiters and in particular to arbiters for use in pipelined systems.

BACKGROUND

Pipelined systems generally have a need for fast arbitration schemes to allocate a shared resource among several requesters. One problem with fast arbitration schemes, such as a fixed-priority arbiter, is that fast arbitration schemes are not always fair because preference may be given to higher-priority requesters. Another problem with such fast arbitration schemes is that they may cause starvation because a requestor with a lower priority may never be granted use of the shared resource. Slower arbitration schemes may help ensure fairness and may help prevent starvation, however slower arbitration schemes may result in significant processing delays in pipelined systems.

Thus there is a need for an improved arbiter and method of arbitration suitable for use in a pipelined system.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Figure 1:
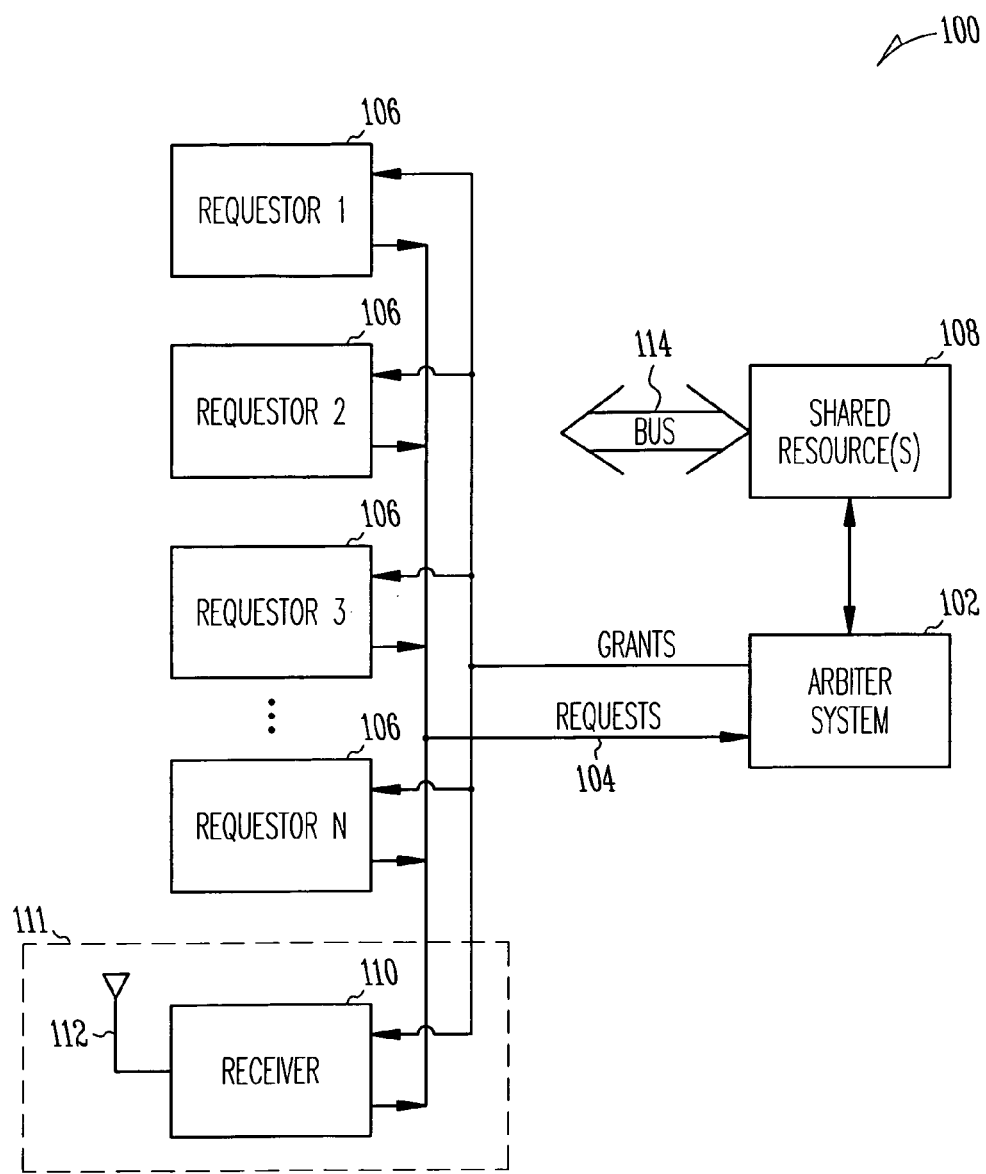
FIG. 1 is a block diagram of a processing system in accordance with embodiments of the present invention.

FIG. 1 is a block diagram of a processing system in accordance with embodiments of the present invention. Processing system 100 may be part of any computing or processing system including computer systems, server systems, and wireless communication devices and systems. In some embodiments, system 100 may be part of a pipelined system. System 100 comprises arbiter system 102 which receives requests 104 from a plurality of requesters 106 requesting use of shared resource 108. In accordance with at least some embodiments of the present invention, arbiter system 102 may grant the requests in accordance with a two-stage arbitration scheme which may improve access of lower-priority requestors to shared resource 108. In some embodiments, arbiter system 102 may comprise a rotating-priority arbiter.

Requestors 106 may include any device or element that requests use of a shared resource. For example, requesters 106 may include, among other things, portions of a processor, direct memory access (DMA) units, network interfaces, digital signal processors (DSPs), etc.

Shared resource 108 may include one or more resources that may be shared among requestors 106. Requestors 106 may include, for example, memory controllers, processors and processing resources including cryptographic processors, network controllers including wireless local area network controllers, signal processors, a shared bus, shared memory resources, floating-point units (FPUs), application accelerators, and/or data acquisition devices. When granted access, requesters 106 may access one or more of shared resources 108 over a communication path, such as bus 114, although requesters 106 may access shared resources by other techniques, including, for example, multi-port access, access through a cross-bar switch or switch fabric, or access through nearest neighbor communications.

In one embodiment, system 100 may be coupled to or may be part of wireless transceiver 111. In this embodiment, receiver 110 may comprise at least one of requesters 106 and may receive communications through antenna 112. In this embodiment, system 100 including receiver 110 and antenna 112 may be part of a wireless communication device, such as a personal digital assistant (PDA), a laptop or portable computer with wireless communication capability, a web tablet, a wireless telephone, a wireless headset, a pager, an instant messaging device, an MP3 player, a digital camera, an access point, or other device that may receive and/or transmit information wirelessly. In this embodiment, receiver 110 may receive RF communications in accordance with specific communication standards, such as the IEEE 802.11(a), 802.11(b) and/or 802.11(g) standards for wireless local area network standards, although receiver 110 may receive communications in accordance with other techniques including Digital Video Broadcasting Terrestrial (DVB-T) broadcasting standard, and the High performance radio Local Area Network (HiperLAN) standard. Antenna 112 may be almost any type of antenna including a dipole antenna, a monopole antenna, a loop antenna, a microstrip antenna or other type of antenna suitable for reception and/or transmission of RF signals, which may be processed by receiver 110.

As used herein, priority-based arbitration refers to a method of distributing resources in which some requesters are given preferential treatment according to their assigned priority. When multiple requesters ask for the same resource, it is granted to the requester with the highest priority. The priority assigned to each requestor may be fixed, or programmable, or may change over time via a variety of algorithms. Unfair arbitration refers to an arbitration method that may not give all requesters an equal opportunity to obtain the resource. Fairer arbitration is an arbitration scheme that comes closer to being fair (that is, to treating all requesters about the same) than some other scheme. Fixed-priority arbitration is an arbitration scheme in which a priority assigned to each requestor may be fixed and generally does not change over time. Least-recently-granted arbitration is an arbitration scheme that grants a resource to the requester that has not been granted the resource for the longest period of time. For example, if requesters A and B both request the same resource, and requestor A was last granted the resource 100 clock cycles ago, and requestor B was last granted the resource more than 100 clock cycles ago (or had never been granted the resource), the resource would be granted to requestor B when least-recently granted arbitration is implemented.

Although system 100 is illustrated as having several separate functional elements, one or more of the functional elements may be combined and may be implemented by combinations of software configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for at least performing the functions described herein.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof.

Figure 2:
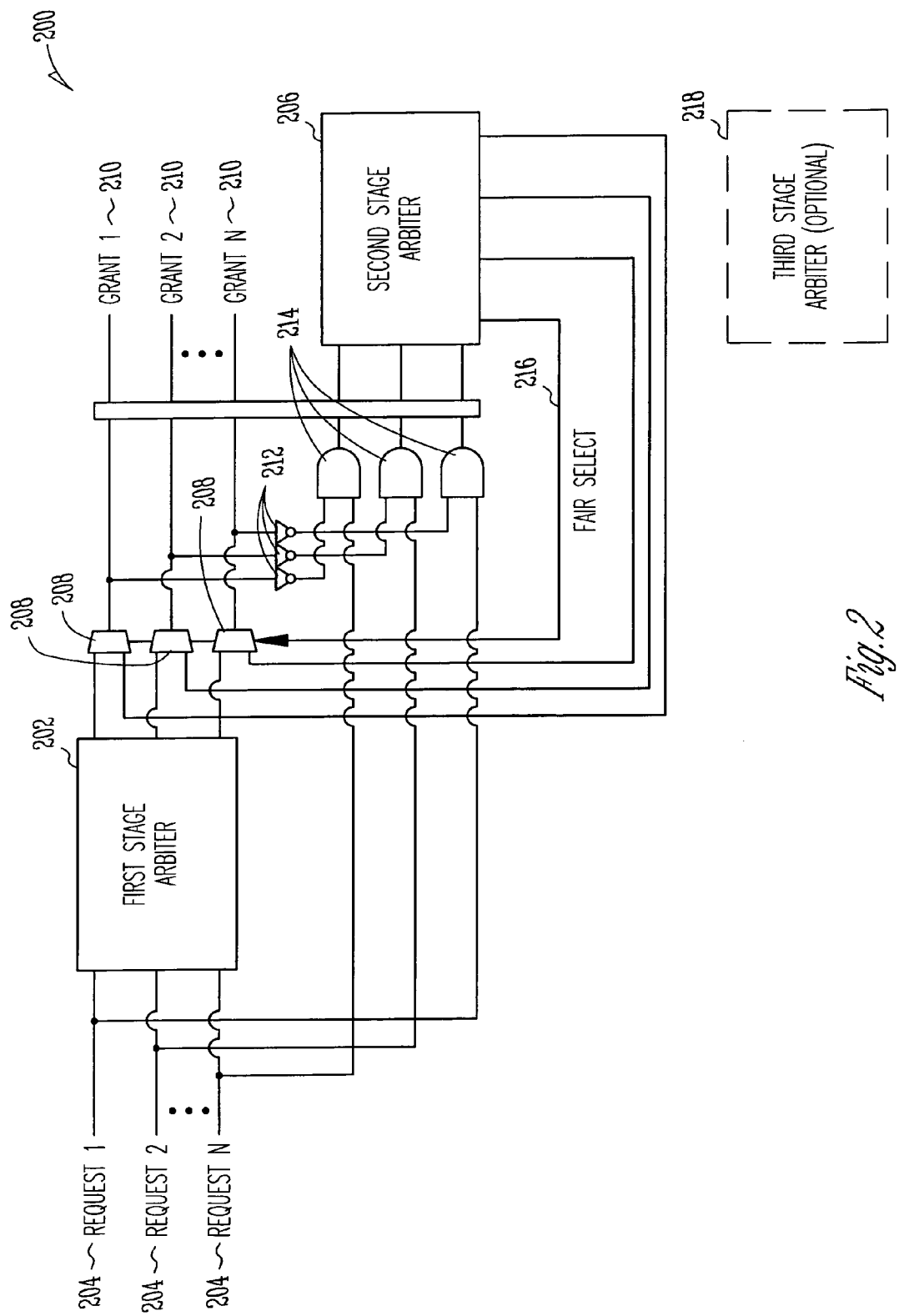
FIG. 2 is a block diagram of a two-level arbiter system in accordance with embodiments of the present invention.

FIG. 2 is a block diagram of a two-level arbiter system in accordance with embodiments of the present invention. Embodiments of the present invention provide a high-speed starvation-free arbiter system, and two-stage arbitration method, although the scope of the invention is not limited in this respect. A rotating-priority arbiter system is also provided that uses either a counter or pseudo-random number generator to rotate priorities of requests.

Two-level arbiter system 200 may be suitable for use as arbiter system 102 (FIG. 1), although other arbiter systems may also be suitable. System 200 may implement a two-level arbitration scheme which may improve access of lower-priority requesters to a shared resource, such as shared resource 108 (FIG. 1). Arbiter system 200 includes first-stage arbiter 202 to grant one of requests 204 from one of a plurality of requesters, such as requestors 106 (FIG. 1), in accordance with an arbitration scheme implemented by arbiter 202. Arbiter system 200 also includes second-stage arbiter 206 to grant a remaining one of requests 204 in accordance with an arbitration scheme implemented by arbiter 206. In other words, second stage arbiter 206 may arbitrate among the requests that were not granted by first-stage arbiter 202. Second-stage arbiter 206 may exclude one or more of the requests 204 that were granted by first-stage arbiter 202.

In one embodiment, the arbitration scheme implemented by arbiter 202 may comprise a priority encoder and may implement a fixed-priority arbitration scheme. In this embodiment, first-stage arbiter 202 may grant a request to one of the plurality of requests 204 having a higher or highest priority. First-stage arbiter 202 may also implement round-robin arbitration schemes, random arbitration schemes, rotating-priority arbitration schemes, least-recently-serviced arbitration schemes, etc. In one embodiment, the arbitration scheme implemented by second-stage arbiter 206 may be a priority-based arbitration with rotating prioritization of the remaining requestors. In yet another embodiment, the arbitration scheme implemented by second-stage arbiter 206 may include a least-recently granted arbitration scheme. This two-stage arbitration scheme may help improve access of lower-priority requesters to a shared resource.

In one embodiment, first-stage arbiter 202 may operate in a first-pipeline stage of a pipelined system such as system 100 (FIG. 1), and second-stage arbiter 206 may operate in a second-pipeline stage which follows the first-pipeline stage. First-stage arbiter 202 may operate during a first clock cycle of the pipeline and second-stage arbiter 206 may operate during a second or subsequent clock cycle of the pipeline.

System 200 may include logic circuitry, such as a plurality of multiplexers 208, to multiplex outputs from first-stage and second-stage arbiters 202, 206 to provide a plurality of grant outputs 210. The logic circuitry may also include, for example, inverters 212 and 'AND' gates 214 to exclude one or more requests granted by first-stage arbiter 202 and provide non-excluded/previously denied requests from the remaining requesters to second-stage arbiter 206. In embodiments, second-stage arbiter 206 may assert fair-select signal 216 when operating to allow multiplexers 208 to provide grant outputs 110 from second-stage arbiter 206 instead of from first-stage arbiter 202. Second-stage arbiter 206 may assert fair-select signal 216 when it provides a grant to a previously denied request.

Arbiters 202 and 206 may be comprised of logic circuitry to implement a predetermined arbitration scheme. In other embodiments, one or more state machines may implement the arbitration scheme of arbiters 202 and 206.

In another embodiment, system 200 may be a multi-stage arbiter having more than two arbitration stages. In this embodiment, system 200 may include third-stage arbiter 218 to grant a request to one of the still yet remaining requests after second-stage arbiter 206 grants one of the previously denied requests.

In some embodiments, the arbitration scheme implemented by first-stage arbiter 202 may be a fast arbitration scheme that may not necessarily be fair (e.g., one requestor may usually be given preference) and may cause starvation (e.g., a requestor with a low priority may almost never be granted use of the shared resource). In these embodiments, the arbitration scheme implemented by second-stage arbiter 206 may be slower and/or fairer. Second-stage arbiter 206 may implement an arbitration scheme that helps ensure that every requestor may eventually be granted the shared resource. In some embodiments, when requests for a shared resource are made in the same pipeline as the arbitration among those requests, the pipeline clock rate may be increased without some requesters experiencing starvation.

In one embodiment, at least portions of arbiter system 200 may be implemented by a computing platform which executes instructions stored on or in an article that may comprise a storage medium. When executed by the computing platform, the instructions may result in applying a first arbitration scheme to a plurality of requests to grant one of the requests, and applying a second arbitration scheme to remaining of the requests to grant one of the remaining requests.

Figure 3:
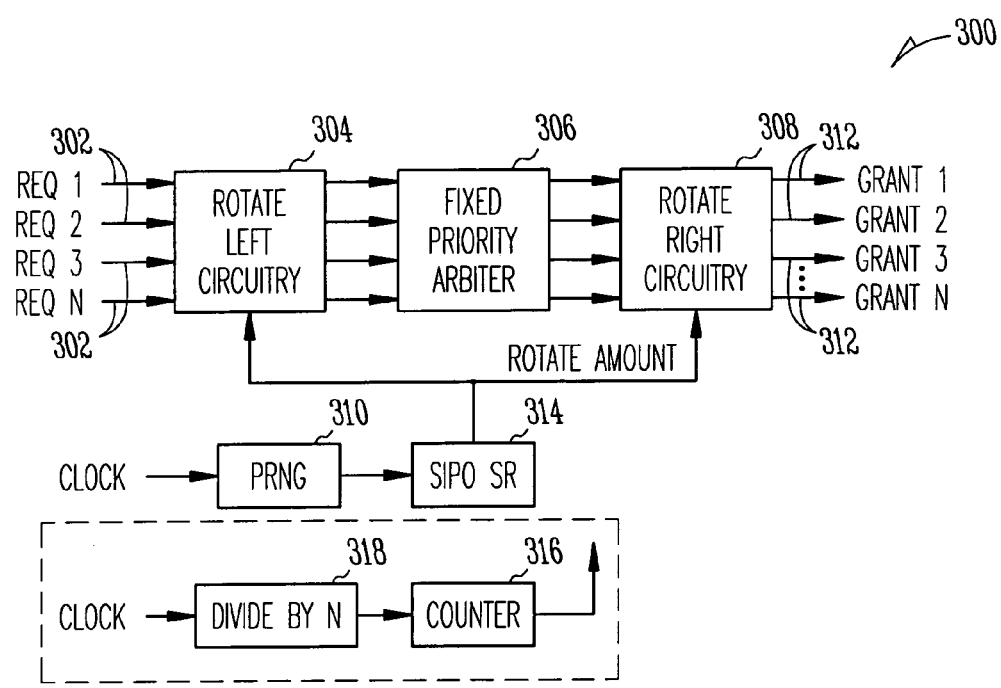
FIG. 3 is a block diagram of a rotating-priority arbiter element in accordance with embodiments of the present invention.

FIG. 3 is a block diagram of a rotating-priority arbiter element in accordance with embodiments of the present invention. Rotating-priority arbiter element 300 may be suitable for use as first-stage arbiter 202 (FIG. 2) or second-stage arbiter 206 (FIG. 2), although other arbiters are also suitable. In embodiments, rotating-priority arbiter element 300 may be suitable for use as arbiter system 102 (FIG. 1).

Rotating-priority arbiter element 300 may implement a rotating-priority arbitration scheme allowing the order of requests 302 to be rotated or shifted in some manner. In one embodiment, rotating-priority arbiter element 300 includes rotate circuitry 304 to shift the priority of requests 302. Rotating-priority arbiter element 300 may also include arbiter 306 to receive the shifted requests from rotate circuitry 304 and to grant one of the requests in accordance with an arbitration scheme. In one embodiment, the arbitration scheme implemented by arbiter 306 may comprise a fixed-priority arbitration scheme although other arbitration schemes are also suitable. Rotating-priority arbiter element 300 also includes rotate circuitry 308 to re-shift the order of grants received from arbiter element 306 to restore an initial association between requests 302 and grants 312.

In one embodiment, arbiter element 300 includes pseudo-random number generator (PRNG) 310 to generate a pseudo-random number for use by rotate circuitry 304 and 308 as a rotate amount. In this embodiment, rotate circuitry 304 may rotate the order of request 302 in one direction by the rotate amount while rotate circuitry 308 may rotate the order of grants by the rotate amount in the opposite direction to restore the association between the requests 302 and grants 312. In one embodiment, pseudo-random number generator 310 may be comprised of a linear-feedback shift register to generate the pseudo-random number although any technique for generating random and pseudo-random numbers may be suitable.

In one embodiment, arbiter element 300 may include serial-in, parallel-out shift register (SIPO SR) 314 to receive serial bits from pseudo-random number generator 310 and to provide a parallel output to rotate circuitry 302 and 308 for use as the rotate amount. In this embodiment, the serial bits may be shifted into serial-in, parallel-out shift register 314 at an arbitration clock rate.

In an alternate embodiment, arbiter element 300 may include counter 316 and divide-by circuitry 318, instead of pseudo-random number generator 310 and/or serial-in, parallel-out shift register 314, to generate the rotate amount for rotate circuitry 304 and 308. In this embodiment, divide-by circuitry 318 may divide a clock rate and provide an arbitration rate to counter 316 for use in generating the rotate amount. In embodiments, divide-by circuitry 318 may divide an input clock by almost any number ranging from two to thirty-two or greater.

In one embodiment, rotating-priority arbiter 300 may comprise a priority-shifting element to shift priorities of requests in a non-uniform manner. Arbiter 300 may also comprise an arbiter element to receive the shifted requests and to grant one of the requests, and a priority-restoring element to restore an association between the requests and the grants.

Figure 4:
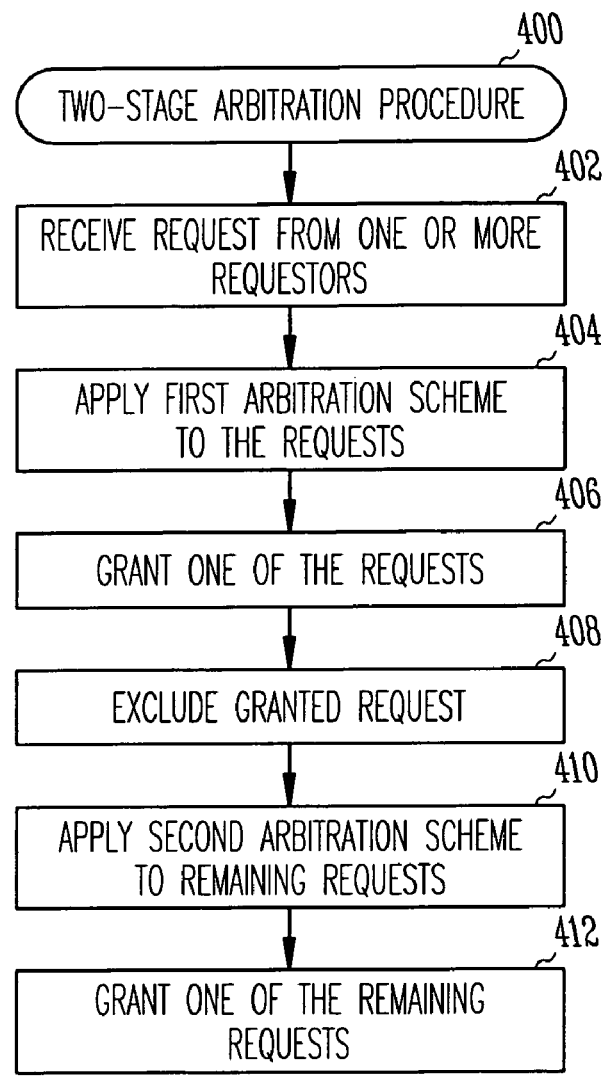
FIG. 4 is a flow chart of a two-stage arbitration procedure in accordance with embodiments of the present invention.

FIG. 4 is a flow chart of a two-stage arbitration procedure in accordance with embodiments of the present invention. Two-stage arbitration procedure 400 may be performed by arbiter system 200, although other arbiters may also perform procedure 400. In operation 402, requests for access to a shared resource are received. The requests may be prioritized. In operation 404, a first arbitration scheme is applied to the requests. The first arbitration scheme may be applied by a first-stage arbiter, such as arbiter 202 (FIG. 2). For example, in one embodiment, a fixed-priority arbitration scheme may be applied to the requests, while in other embodiments; a rotating-priority arbitration scheme may be applied to the requests. In operation 406, in response to operation 404, one of the requests may be granted, and a grant signal may be provided to the appropriate requestor.

In operation 408, the granted request may be excluded from subsequent consideration. Logic circuitry maybe used as part of an arbiter to exclude the granted request. In operation 410, a second arbitration technique may be applied to the remaining requests. The second arbitration scheme may be applied by a second-stage arbiter, such as arbiter 206 (FIG. 2). In operation 412, in response to operation 408, one of the remaining requests may be granted and a grant signal may be provided to the appropriate requester.

In embodiments, operations 402 through 412 may be repeated as part of pipelined operations in a processing system to arbitrate among newly received and remaining requests for subsequent pipelined stages and/or clock cycles. In embodiments, operations 402 through 406 may be performed as part of a first pipelined stage and operations 408 through 412 may be performed as part of a second or subsequent pipelined stage. In at least one embodiment, operations 404 and 406 may be performed when the second-stage arbiter is not operating or is not asserting a signal, such as fair select signal 216 (FIG. 2). In one embodiment, operations 408 through 412 may be performed when un-granted/remaining requests remain after operation 406. In this embodiment, when no un-granted requests remain, procedure 400 may refrain from performing operations 408 through 412. Although the individual operations of procedure 400 are illustrated and described as separate operations, one or more of the individual operations may be performed concurrently and nothing requires that the operations be performed in the order illustrated.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. An arbiter system comprising:
   a first-stage arbiter that operates in a first pipeline stage of a pipelined system to grant a request to one of a plurality of requestors in accordance with a first arbitration scheme; and
   a second-stage arbiter that operates in a second pipeline stage of the pipelined system to grant a request to a remaining one of the requestors in accordance with a second arbitration scheme.

2. The arbiter system of claim 1 wherein the first arbitration scheme is an unfair arbitration scheme to grant requests based on priority, and wherein the second arbitration scheme is a fairer arbitration scheme to grant remaining requests independent of priority.

3. The arbiter system of claim 2 wherein the first arbitration scheme comprises a fixed-priority arbitration scheme and the first-stage arbiter grants a request to one of the plurality of requestors having a higher priority, and
   wherein the second arbitration scheme includes a least-recently granted arbitration scheme to improve access of lower priority of the requestors to a shared resource.

4. The arbiter system of claim 1 wherein the second arbitration scheme implements priority-based arbitration with rotating prioritization of the requestors to improve access of lower priority of the requestors to a shared resource.

5. The arbiter system of claim 4 wherein the second-stage arbiter further comprises a pseudo-random number generator to generate a pseudo-random number for use as a rotate amount in rotating the priorities of the requestors.

6. The arbiter system of claim 5 wherein the pseudo-random number generator is comprised of a linear-feedback shift register to generate the pseudo-random number.

7. The arbiter system of claim 6 wherein the second-stage arbiter comprises a serial-in, parallel-out shift register to receive serial bits from the linear-feedback shift register generator to provide the rotate amount.

8. The arbiter system of claim 1 wherein the second-stage arbiter excludes one or more requests granted by the first-stage arbiter in performing the second arbitration scheme.

9. The arbiter system of claim 1 wherein the first-stage arbiter operates during a first clock cycle of a pipeline, and the second-stage arbiter operates during a subsequent clock cycle of the pipeline following the first clock cycle.

10. The arbiter system of claim 1 further comprising:
a plurality of multiplexers to multiplex outputs from the first-stage and second-stage arbiters to provide a plurality of grant outputs; and
logic circuitry to exclude one or more requests granted by the first-stage arbiter and provide previously denied requests from the remaining of the requestors to the second-stage arbiter.

11. The arbiter system of claim 1 wherein the request is one of a plurality of prioritized requests from the requestors for access to a shared resource, the shared resource coupled with the requestors and being one of either a memory controller, a processor, a wireless local area network controller, a signal processor of a wireless receiver, or a shared bus.

12. The arbiter system of claim 1 further comprising a third stage arbiter to grant a request to one of the requestors remaining after operation of the second-stage arbiter.

13. A method of operating an arbiter in a pipelined system comprising:
applying a first arbitration scheme within a first pipeline stage of the pipelined system to a plurality of requests to grant one of the requests, the requests received from one or more of a plurality of requestors; and
applying a second arbitration scheme within a second pipeline stage of the pipelined system to remaining of the requests to grant one of the remaining requests.

14. The method of claim 13 wherein the first arbitration scheme comprises a fixed-priority arbitration scheme, the method further comprising granting the request to one of the plurality of requestors having a higher priority.

15. The method of claim 14 further comprising the second arbitration scheme implementing a least-recently granted arbitration scheme to improve access of lower priority of the requestors to a shared resource.

16. The method of claim 14 further comprising the second arbitration scheme implementing a priority-based arbitration with rotating prioritization of the requestors to improve access of lower priority of the requestors to a shared resource.

17. The method of claim 16 wherein the priority-based arbitration with rotating prioritization comprises generating a pseudo-random number for use as a rotate amount in rotating priorities among requestors.

18. The method of claim 17 wherein generating comprises generating the random number with a linear-feedback shift register.

19. The method of claim 13 further comprising the second arbitration scheme excluding one or more request granted by applying the first arbitration scheme.

20. A wireless communication system comprising:
a dipole antenna to receive a communication signal; and
a receiver to process the received signal, the receiver comprising:
a shared resource;
a plurality of requestors to generate requests to access the shared resource; and
an arbiter system comprising a first-stage arbiter that operates in a first pipeline stage of a pipelined system to grant a request to one of the plurality of requestors in accordance with a first arbitration scheme, and a second-stage arbiter that operates in a second pipeline stage of the pipelined system to grant a request to a remaining one of the requestors in accordance with a second arbitration scheme.

21. The system of claim 20 wherein the first arbitration scheme comprises a fixed-priority arbitration scheme and the first-stage arbiter grants a request to one of the plurality of requestors having a higher priority, and
wherein the second arbitration scheme includes one of either:
a least-recently granted arbitration scheme to improve access of lower priority of the requestors to a shared resource, or
a priority-based arbitration with rotating prioritization of the requestors to improve access of lower priority of the requestors to a shared resource.

22. The system of claim 20 wherein the second-stage arbiter excludes one or more requests granted by the first-stage arbiter in performing the second arbitration scheme.

23. An article comprising a storage medium having instructions stored thereon, that when executed by a computing platform, result in:
applying a first arbitration scheme within in a first pipeline stage of a pipelined system to a plurality of requests to grant one of the requests, the requests received from one or more of a plurality of requestors; and
applying a second arbitration scheme within a second pipeline stage of the pipelined system to remaining of the requests to grant one of the remaining requests.

24. The article of claim 23 wherein the first arbitration scheme comprises a fixed-priority scheme, and wherein the instructions, when further executed by the computing platform result in granting the request to one of the plurality of requestors having a higher priority, and
wherein the second arbitration scheme includes one of either:
a least-recently granted arbitration scheme to improve access of lower priority of the requestors to a shared resource, or
a priority-based arbitration with rotating prioritization of the requestors to improve access of lower priority of the requestors to a shared resource.

25. The article of claim 23 wherein the instructions, when further executed by the digital computing platform result in the second arbitration scheme excluding one or more requests granted by applying the first arbitration scheme.

* * * * *

UNITED STATES PATENT AND TRADEMARK OFFICE
CERTIFICATE OF CORRECTION

| | | |
|---|---|---|
| PATENT NO. | : 7,120,714 B2 | Page 1 of 1 |
| APPLICATION NO. | : 10/445533 | |
| DATED | : October 10, 2006 | |
| INVENTOR(S) | : O'Connor et al. | |

It is certified that error appears in the above-identified patent and that said Letters Patent is hereby corrected as shown below:

On the face page, in field (54), in "Title", in column 1, line 3, delete "TWO STAGE" and insert -- TWO-STAGE --, therefor.

In column 1, line 3, delete "TWO STAGE" and insert -- TWO-STAGE --, therefor.

In column 8, line 2, in Claim 19, delete "request" and insert -- requests --, therefor.

In column 8, line 38, in Claim 23, after "within" delete "in".

Signed and Sealed this

Ninth Day of January, 2007

JON W. DUDAS
*Director of the United States Patent and Trademark Office*